United States Patent
Dodd

(10) Patent No.: US 9,801,484 B2
(45) Date of Patent: Oct. 31, 2017

(54) STEMWARE STABILIZER

(71) Applicant: Keeley Dodd, Wichita, KS (US)

(72) Inventor: Keeley Dodd, Wichita, KS (US)

( * ) Notice: Subject to any disclaimer, the term of this patent is extended or adjusted under 35 U.S.C. 154(b) by 0 days.

(21) Appl. No.: 14/811,773

(22) Filed: Jul. 28, 2015

(65) Prior Publication Data

US 2017/0027356 A1 Feb. 2, 2017

(51) Int. Cl.
| | | |
|---|---|---|
| *B65D 1/40* | (2006.01) | |
| *A47G 23/02* | (2006.01) | |
| *F16B 1/00* | (2006.01) | |
| *F16B 47/00* | (2006.01) | |

(52) U.S. Cl.
CPC ..... *A47G 23/0225* (2013.01); *A47G 23/0216* (2013.01); *F16B 1/00* (2013.01); *F16B 47/003* (2013.01); *F16B 2001/0035* (2013.01)

(58) Field of Classification Search
CPC .............................. A47G 23/0225; B60N 3/10
USPC ........... 220/737, 574, 575, 592.16; 206/426; 211/60.1; 248/152, 229.26, 310, 311.2, 248/346.11
See application file for complete search history.

(56) References Cited

U.S. PATENT DOCUMENTS

| | | | | |
|---|---|---|---|---|
| 774,479 A | * | 11/1904 | Lange ................ | A47G 23/0208 206/426 |
| 1,930,415 A | * | 10/1933 | Cantine ................ | A47G 23/032 215/394 |
| 2,017,168 A | * | 10/1935 | Sanders ................ | A47G 23/032 215/394 |
| 3,491,893 A | * | 1/1970 | Morris ................ | A47B 13/16 211/162 |
| 3,672,514 A | * | 6/1972 | Tucker ................ | A47F 5/112 206/426 |
| 3,881,674 A | * | 5/1975 | Greene, III ............... | A47G 7/00 206/423 |
| 4,204,598 A | * | 5/1980 | Adams ................ | B65D 75/02 206/426 |
| 4,555,040 A | * | 11/1985 | Butenschon ....... | A47G 19/2227 215/365 |

(Continued)

FOREIGN PATENT DOCUMENTS

| | | | | |
|---|---|---|---|---|
| AU | 2005201478 A1 | * | 10/2006 | |
| EP | 0231471 A2 | * | 8/1987 | ............. A47G 19/06 |

(Continued)

*Primary Examiner* — Kimberly Wood
(74) *Attorney, Agent, or Firm* — Waller Lansden Dortch & Davis, LLP; Matthew C. Cox

(57) ABSTRACT

A stemware stabilizer apparatus engages a piece of stemware between the stem and foot of the stemware to prevent tipping over. The stabilizer apparatus includes a stabilizer body having an upper side and a lower side. A contact surface is defined on the lower side of the stabilizer body. The contact surface is positioned to contact the upper side of a foot on stemware. A stem receiver slot is defined in the stabilizer body allowing passage of the stem. The stem protrudes upwardly through the slot when the apparatus is installed on the stemware. A concave chamber is defined by the lower side of the stabilizer body shaped to at least partially receive the foot. The stabilizer body applies a downward force against the foot and includes a sufficiently heavy material to prevent the stemware from tipping over under some conditions.

13 Claims, 11 Drawing Sheets

(56) References Cited

U.S. PATENT DOCUMENTS

| | | | | |
|---|---|---|---|---|
| 4,607,758 A * | 8/1986 | Stevens | ................... | A47G 19/06 |
| | | | | 206/509 |
| 4,860,895 A * | 8/1989 | Iaslovits | ............ | A47G 23/0633 |
| | | | | 206/426 |
| 5,058,737 A * | 10/1991 | Patterson | ............. | A47G 19/065 |
| | | | | 206/217 |
| 5,111,960 A * | 5/1992 | Zilliox | ................... | A47G 19/23 |
| | | | | 220/23.4 |
| 5,361,932 A * | 11/1994 | Friedrich | ............... | A47G 19/04 |
| | | | | 206/217 |
| 5,419,455 A * | 5/1995 | Russeau | ................. | A47G 19/06 |
| | | | | 206/562 |
| 6,059,138 A * | 5/2000 | Labruyere | .......... | A47G 23/0225 |
| | | | | 220/23.4 |
| 6,460,722 B2 * | 10/2002 | Lee | .................... | A47G 23/0225 |
| | | | | 220/23.88 |
| 7,243,889 B1 * | 7/2007 | Lopez-Torres, Jr. | ........................ | |
| | | | | A47G 23/0225 |
| | | | | 220/737 |
| D687,264 S * | 8/2013 | Stetson | ....................... | D7/624.1 |
| 8,646,740 B1 * | 2/2014 | Nelson | ............... | A47G 23/0306 |
| | | | | 215/393 |
| 2007/0062961 A1 * | 3/2007 | Rigas | ................. | A47G 19/2205 |
| | | | | 220/703 |
| 2010/0176139 A1 * | 7/2010 | Nargi | ................. | A47G 23/0225 |
| | | | | 220/737 |
| 2013/0062494 A1 * | 3/2013 | Cecil | ...................... | A47G 23/03 |
| | | | | 248/346.11 |
| 2013/0105650 A1 * | 5/2013 | Cohen | ................ | A47G 23/0225 |
| | | | | 248/229.26 |
| 2014/0209769 A1 * | 7/2014 | DeWald | ................... | B60N 3/10 |
| | | | | 248/226.11 |
| 2015/0108702 A1 * | 4/2015 | Quanh | ................. | A47J 47/005 |
| | | | | 269/289 R |
| 2016/0157645 A1 * | 6/2016 | Bayless | .............. | A47G 19/2227 |
| | | | | 220/600 |

FOREIGN PATENT DOCUMENTS

| | | | | |
|---|---|---|---|---|
| GB | 406625 A | * | 3/1934 | ............. B65D 23/06 |
| GB | 2085061 A | * | 4/1982 | ......... A47G 23/0225 |

* cited by examiner

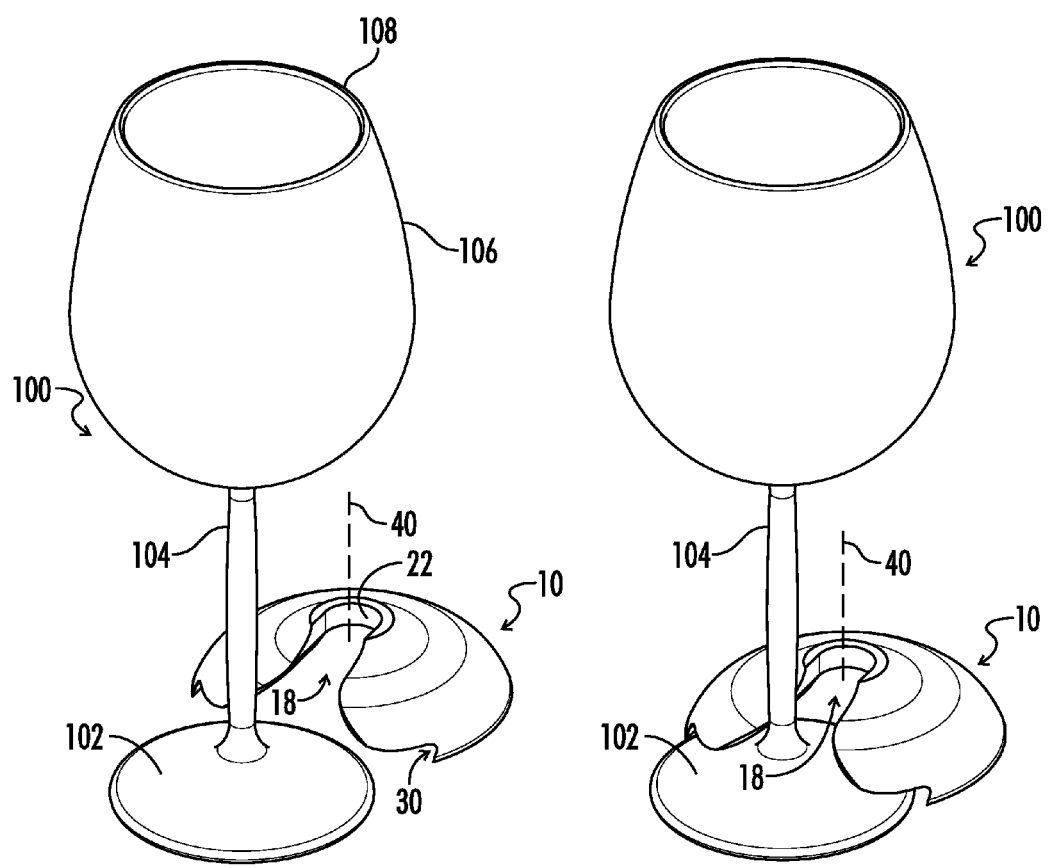
*FIG. 6*  *FIG. 7*

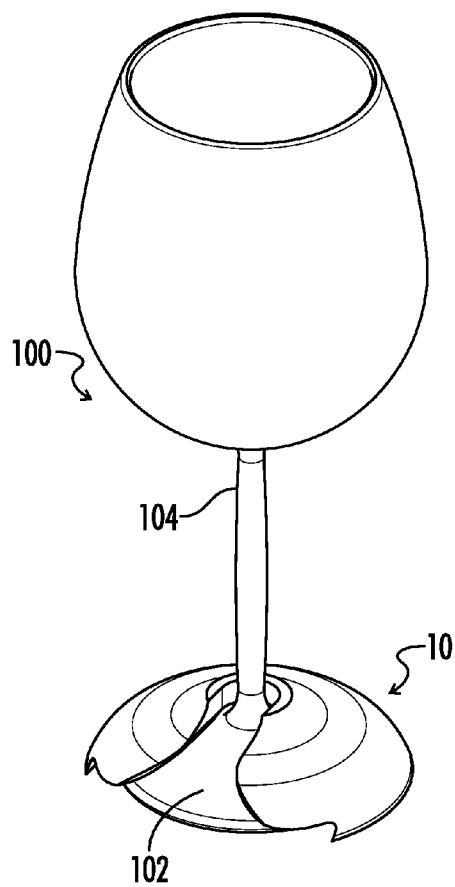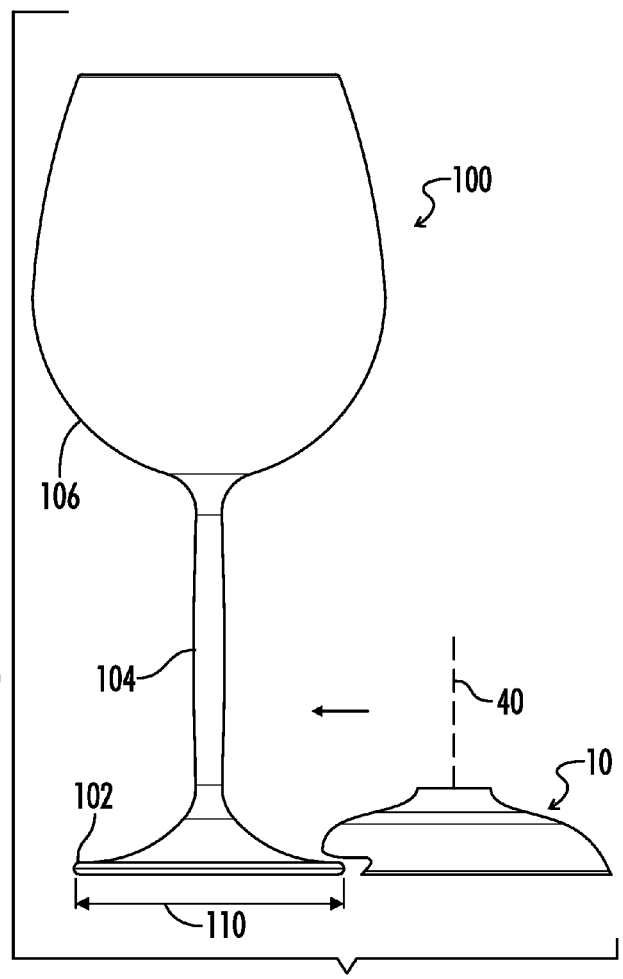
FIG. 8
FIG. 9

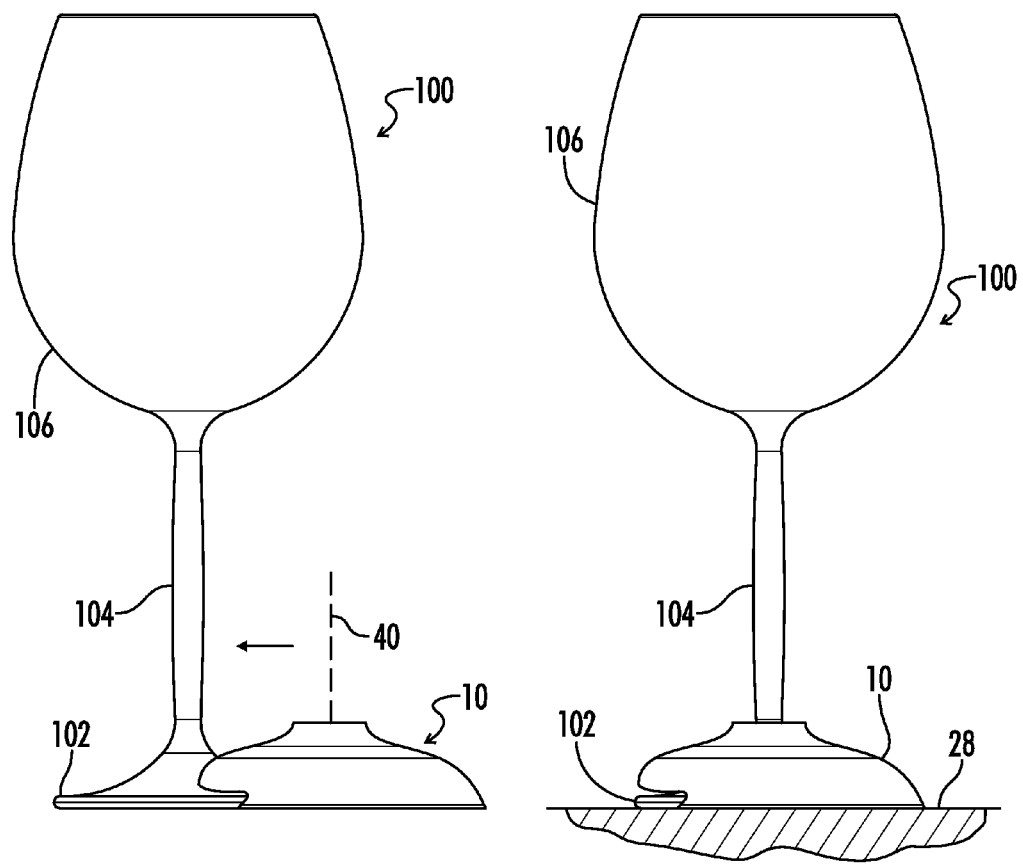
*FIG. 10*  *FIG. 11*

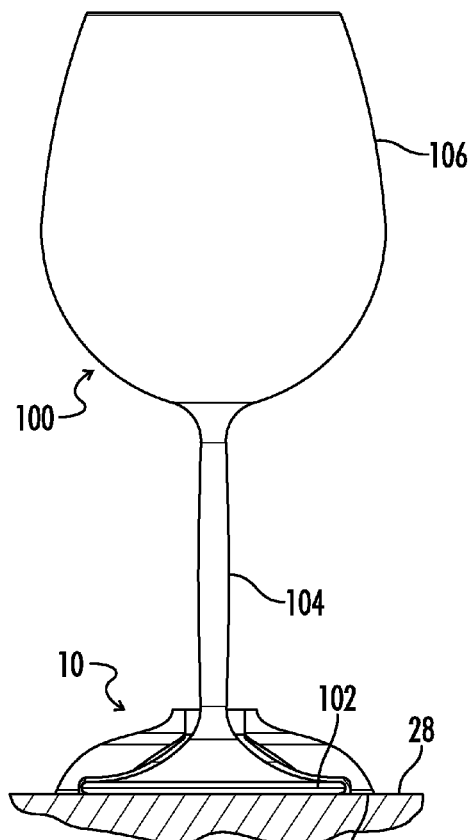
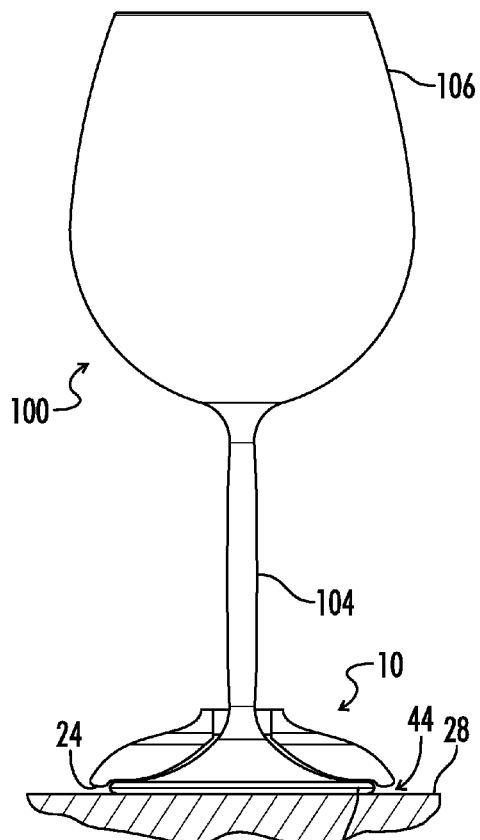
FIG. 19
FIG. 20

STEMWARE STABILIZER

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

This application claims benefit of the following patent application which is hereby incorporated by reference: Not Applicable.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND

The present invention relates generally to devices and methods for stabilizing drinkware and more particularly to devices and methods for stabilizing a stemware to prevent tipping over.

Conventional stemware such as wine glasses, martini glasses, snifters, and other stemware includes a base or foot that rests against a table or other surface. A stem rises from the foot, and a bowl or container is positioned at the top of the stem. A beverage such as a water or wine is contained in the bowl, and a user drinks from an upper rim on the bowl. In many applications, the main volume of liquid is housed in the bowl at a position several inches above the foot.

Stemware is prone to tipping over in various conditions. For example, when a wine glass is set on an uneven surface or table, the glass may tip over. Also, wine glasses may tip over when inadvertently pushed or impacted at a location on the bowl above the stem. Additionally, when used outdoors, wine glasses may be tipped over when wind blows against the bowl. Wind has a tendency to blow over stemware glasses in outdoor settings. For this reason, users are reluctant to use glass stemware when drinking outdoors, as glass stemware may shatter or crack when tipped over. Tipping over of stemware due to wind also causes spillage of the contents of the bowl. This is undesirable, especially when drinking expensive or rare wine.

Others have attempted to overcome the problems of wine glasses breaking due to tipping over by providing wine glasses made of acrylic, plastic, metal, or other less fragile materials. However, such materials may detract from the experience of drinking wine. Connoisseurs of wine often prefer to drink wine only from proper glass or crystal wine glasses. Such users generally find it unacceptable to substitute glass or crystal wine glasses with other materials when drinking wine.

To overcome this problem, others have attempted to provide rigid fixtures or holders to secure wine glasses when used outdoors. Such devices allow users to continue to use glass or crystal wine glasses outdoors while providing a structure to prevent the wine glass from tipping over. However, such conventional devices are bulky and generally do not work well. Additionally, some conventional devices for stabilizing stemware are cumbersome and apply torque against the stem during use, potentially causing the stem to break.

What is needed then are improvements in devices and methods for stabilizing stemware to prevent tipping over.

BRIEF SUMMARY

The present invention includes a stabilizer apparatus for positioning on stemware such as a wine glass to prevent the glass from tipping over. The stemware typically includes a base, a stem, and a bowl.

In some embodiments, the stabilizer apparatus includes a stabilizer body having an upper side, a lower side, a center axis and an outer perimeter. A stem receiver slot is defined through the stabilizer body extending from the upper side to the lower side. The stem receiver slot is positioned on the stabilizer body from a location on the outer perimeter radially inwardly toward the center axis of the stabilizer body. The stem receiver slot is shaped to allow passage of the stem. A contact surface is located on the lower side of the stabilizer body. The contact surface is positioned to engage the foot when the stem is positioned in the stem receiver slot. The contact surface is positioned to apply a downward force against the foot to prevent the stemware from tipping over.

Another embodiment of the present invention includes an apparatus for stabilizing stemware having a foot, a stem, and a bowl. The apparatus includes a stabilizer body having an upper side, a lower side, a vertical center axis and an outer edge. A stem receiver slot is defined through the stabilizer body from the upper side to the lower side. The stem receiver slot is positioned on the stabilizer body from the outer perimeter radially inwardly toward the center axis of the stabilizer body. The stem receiver slot is shaped to allow radial passage of the stem toward the center axis. An open-bottom, concave foot chamber is defined below the lower side on the stabilizer body. The foot chamber defines a volume shaped to at least partially receive the foot when the stem is received in the stem receiver slot. The stabilizer body is moveable along the stem in the axial direction.

Another embodiment of the present invention includes a weight apparatus for installation on stemware to prevent the stemware from tipping over. The stemware includes a foot, a stem, and a bowl. The weight apparatus includes a weight body having an upper side and a lower side. A stem receiver slot is defined in the weight body. The stem receiver slot is shaped to receive the stem. A concave, open-bottom foot chamber is defined by the lower side of the weight body, the foot chamber defines a volume shaped to at least partially receive the foot. The weight body is axially moveable along the stem when the stem is received in the stem receiver slot.

A further embodiment of the present invention includes an apparatus for stabilizing stemware, the stemware having a foot, a stem rising from the foot, and a bowl on the stem. The apparatus includes a body having an upper side, a lower side, an outer edge and a transverse axis. A stem receiver slot is defined in the body extending from a location on the outer edge of the body toward the axis. The stem receiver slot terminates at a stem support on the body. A concave, open-bottom foot chamber is defined below the lower side on the body. The foot chamber defines a volume shaped to at least partially receive the foot. A contact surface is disposed on the lower side of the body positioned to engage the foot and to apply downward force against the foot. In some embodiments, the body is axially moveable along the stem when the stem is received in the stem receiver slot.

Another object of the present invention is to provide a removable weight that can be applied to a stem on a piece of stemware such as a wine glass to prevent the stemware from tipping over.

A further object of the present invention is to provide a stabilizer device that can be easily installed on and removed from stemware to prevent tipping over.

Yet another object of the present invention is to provide a stabilizer device having a radial slot for receiving a stem on a piece of stemware and a weighted region positioned to apply a downward force against the foot to prevent the stemware from tipping over.

Numerous other objects, advantages and features of the present disclosure will be readily apparent to those of skill in the art upon a review of the following drawings and description of a preferred embodiment.

BRIEF DESCRIPTION OF THE SEVERAL VIEWS OF THE DRAWINGS

FIG. 6 illustrates a perspective view of an embodiment of a stemware stabilizer apparatus positioned for installation on a wine glass.

FIG. 7 illustrates a perspective view of an embodiment of a stemware stabilizer apparatus positioned for installation on a wine glass.

FIG. 8. Illustrates a perspective view of an embodiment of a stemware stabilizer apparatus installed on a wine glass.

FIG. 9 illustrates an elevation view of an embodiment of a stemware stabilizer apparatus positioned for installation on a wine glass.

FIG. 10 illustrates an elevation view of an embodiment of a stemware stabilizer apparatus positioned for installation on a wine glass.

FIG. 11 illustrates an elevation view of an embodiment of a stemware stabilizer apparatus installed on a wine glass.

FIG. 19 illustrates a front elevation view of an embodiment of a stemware stabilizer positioned on a wine glass.

FIG. 20 illustrates a front elevation view of an embodiment of a stemware stabilizer positioned on a wine glass.

DETAILED DESCRIPTION

Figure 1:
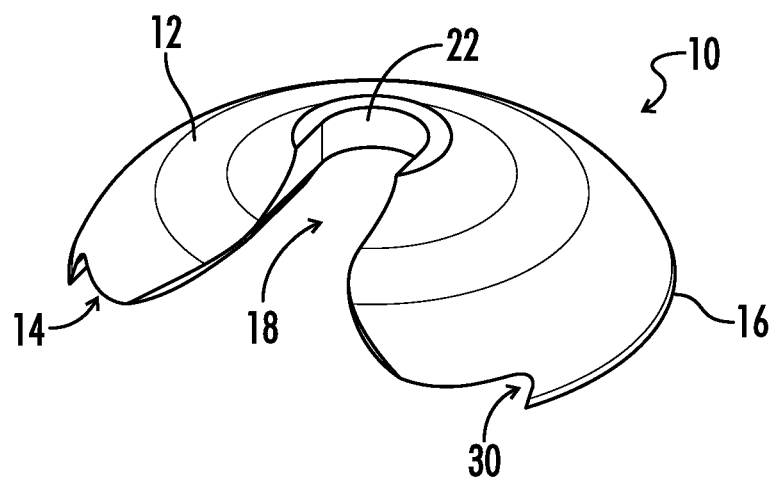
FIG. 1 illustrates a top side perspective view of an embodiment of a stemware stabilizer apparatus.

Referring now to the drawings, an embodiment of a stemware stabilizer apparatus is generally shown in various views. An apparatus in accordance with the present invention may take many forms, and the embodiments shown in the Figures are not intended to be limiting on the scope of the claimed invention. The embodiments shown in the Figures are provided only as examples.

Referring to FIG. 1, an embodiment of a stemware stabilizer apparatus is generally shown in a top perspective view. The stabilizer apparatus may also be referred to as a weight. The stabilizer includes a stabilizer body 10 having an upper side 12 and a lower side 14. Stabilizer body 10 may also be referred to as a weight body in some embodiments. Stabilizer body 10 also includes an outer edge 16. In some embodiments, stabilizer body 10 includes an outer edge 16 having a semicircular profile, forming a disc-shaped object. However, stabilizer body may include many other shapes along outer edge 16, including triangular, square, oval, and other polygonal or curvilinear shapes. Stabilizer body 10 includes any suitable material for stabilizing a foot of a wine glass, including but not limited to plastic, wood, metal, glass, rubber, composite, or any other suitable material. Stabilizer body 10 includes sufficient mass to apply a force against the foot of a wine glass to prevent it from tipping over.

Figure 2:
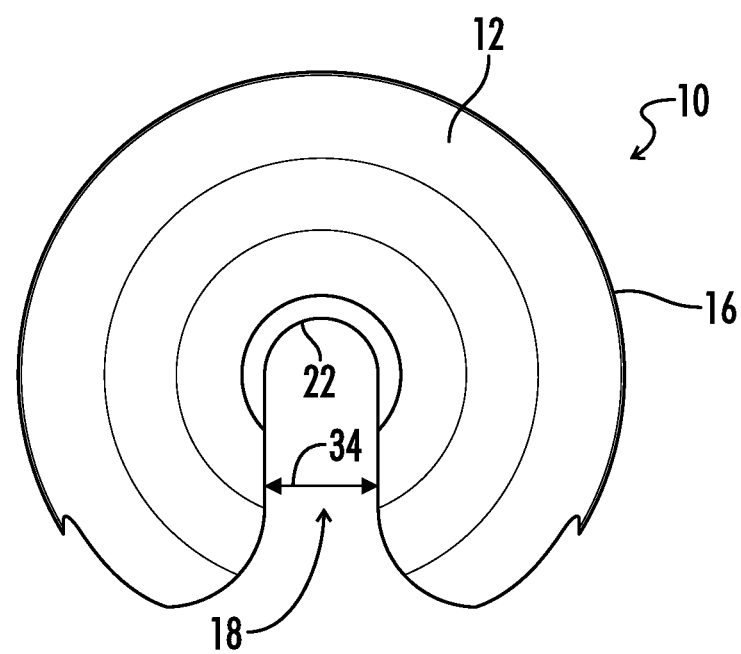
FIG. 2 illustrates a top view of an embodiment of a stemware stabilizer apparatus.

A stem receiver slot 18 is defined in stabilizer body 10 in some embodiments. Stem receiver slot 18 is positioned to provide a passage for a stem on a wine glass. Stem receiver slot 18 may be defined radially in stabilizer body 10 in some embodiments, as seen in FIGS. 1 and 2. In various other embodiments, stem receiver slot 18 may be angled at a non-radial orientation. Stem receiver slot 18 has a stem receiver slot width 34 generally dimensioned to accommodate a stem on a wine glass, and stem receiver slot width 34 is generally greater than the local diameter of a wine glass stem. In some embodiments, stabilizer body 10 has the shape of a round disk with a center axis located through the center of the disc. Stem receiver slot 18 extends from outer edge 16 to the center axis of the stabilizer body 10 in some embodiments.

Stem receiver slot 18 terminates in stabilizer body 10 at a stem support 22. Stem support 22 provides a stop for the wine glass stem when the stem is received in the stem receiver slot 18. Stem support 22 provides support to a stem to prevent a wine glass from tipping over when the apparatus is installed on a wine glass. Stem support 22 includes a generally semicircular profile in some embodiments, as seen in FIGS. 1 and 2. Stem support 22 includes a radius that is substantially equal to one-half stem receiver slot width 34 in some embodiments. Stem support 22 is integrally formed on stabilizer body 10 as a one-piece construction in some embodiments. In other embodiments, stem support 22 may include a separate piece installed in stem receiver slot 18.

Figure 3:
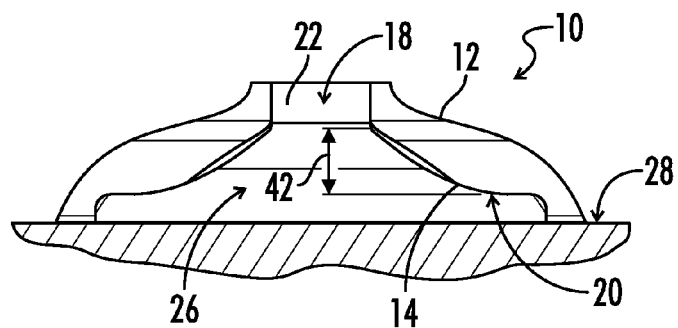
FIG. 3 illustrates a front view of an embodiment of a stemware stabilizer apparatus.

Stabilizer body 10 also defines a foot chamber 26 below the lower side 14 of the stabilizer body 10. Foot chamber 26 includes an open space under the stabilizer body 10. Foot chamber 26 includes a concave shape having an open bottom in some embodiments. The open bottom of foot chamber 26 allows a foot on a wine glass to pass axially into and out of the foot chamber, allowing stabilizer body 10 to be axially moved along the stem of the wine glass. The concave region formed by the foot chamber is shaped to at least partially receive the foot on a piece of stemware such as a wine glass. As such, the stabilizer apparatus at least partially covers the foot of the wine glass when installed on the wine glass. The foot chamber 26 is generally defined between stabilizer body 10 and a resting surface 28 such as a table, as seen in FIG. 3. Foot chamber 26 is shaped to receive the foot on a wine glass when the stem is received in the stem receiver slot 18. Foot chamber 26 includes a tapered profile in some embodiments to match the tapered profile on the upper side of the foot on the stemware.

Stabilizer body 10 forms a raised dome shaped to accommodate the stemware foot under the dome in some applications. The stem protrudes upwardly from the dome through the stem receiver slot 18. When the stemware begins to tip over, the mass of the stabilizer apparatus counteracts the force against the stemware and prevents the stemware from tipping over.

A contact surface 20 is located on the lower side of stabilizer body 10 facing foot chamber 26 in some embodiments. Contact surface 20 includes any portion of stabilizer body 10 facing down toward the foot positioned to contact the upper side of the foot during use. As such, the contact surface 20 applies a downward force against the foot to aid in preventing the stemware from tipping over in some embodiments.

As seen in FIG. 3, in some embodiments, stem support 22 is vertically offset above contact surface 20 by a stem support vertical offset 42. In some embodiments, stem support vertical offset 42 is between about 1.0 mm and about 10 cm. In additional embodiments, stem support vertical offset 42 is between about 5.0 and about 2.0 cm.

Stabilizer body 10 in some embodiments also includes a bottom face 24 positioned to rest against a table or other surface on which a wine glass may be placed. Bottom face 24 extends around a portion of the outer perimeter of the stabilizer body 10. In some embodiments, stabilizer body 10 rests against the foot of the wine glass such that bottom face 24 does not engage the table or surface under the wine glass. In other embodiments, foot chamber 26 is dimensioned such that bottom face 24 rests against a table or other surface under the stemware when the foot is received in the foot chamber 26.

Referring to FIGS. 6-8, a wine glass 100 includes a foot 102, a stem 104, a bowl 106, and a rim 108. A stabilizer device may be installed on the wine glass by receiving the stem 104 in the stem receiver slot toward the center vertical axis 40, or transverse axis, of the stabilizer apparatus. The stem 104 may be inserted until the stem 104 reaches the stem support 22 at the interior end of the stem receiver slot. When the stabilizer device is installed on the stemware, the foot 102 is positioned under the stabilizer body 10, as shown in FIGS. 7 and 8. When positioned on the stemware 100, the stabilizer body 10 is located above the foot 102.

Figure 4:
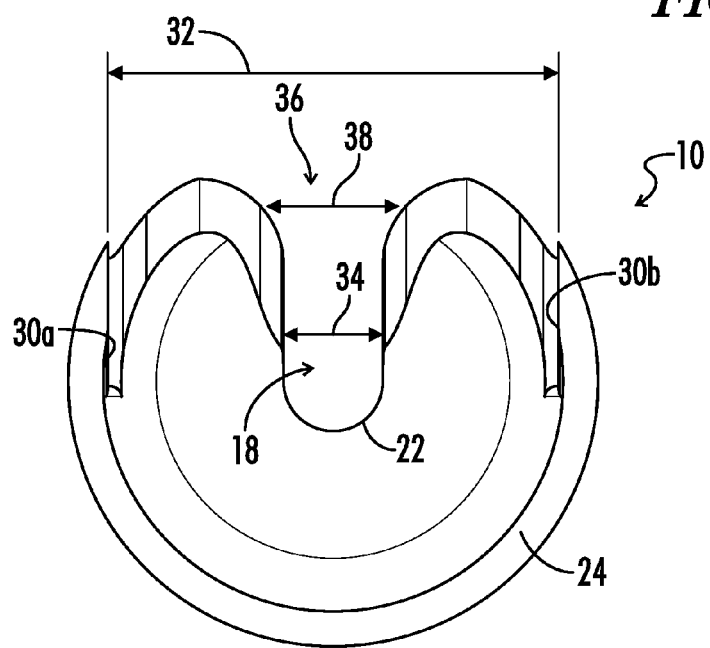
FIG. 4 illustrates a bottom view of an embodiment of a stemware stabilizer apparatus.
Figure 5:
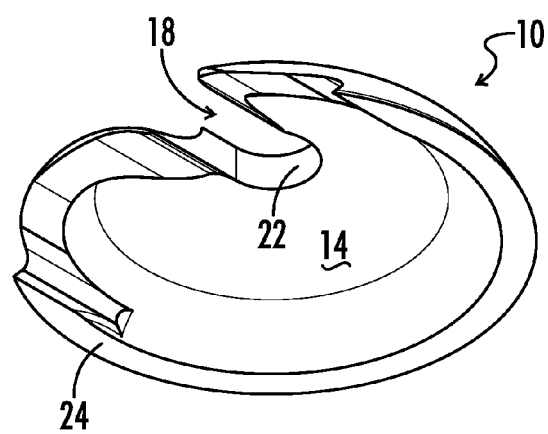
FIG. 5 illustrates a bottom side perspective view of an embodiment of a stemware stabilizer apparatus.
Figures 12, 13:
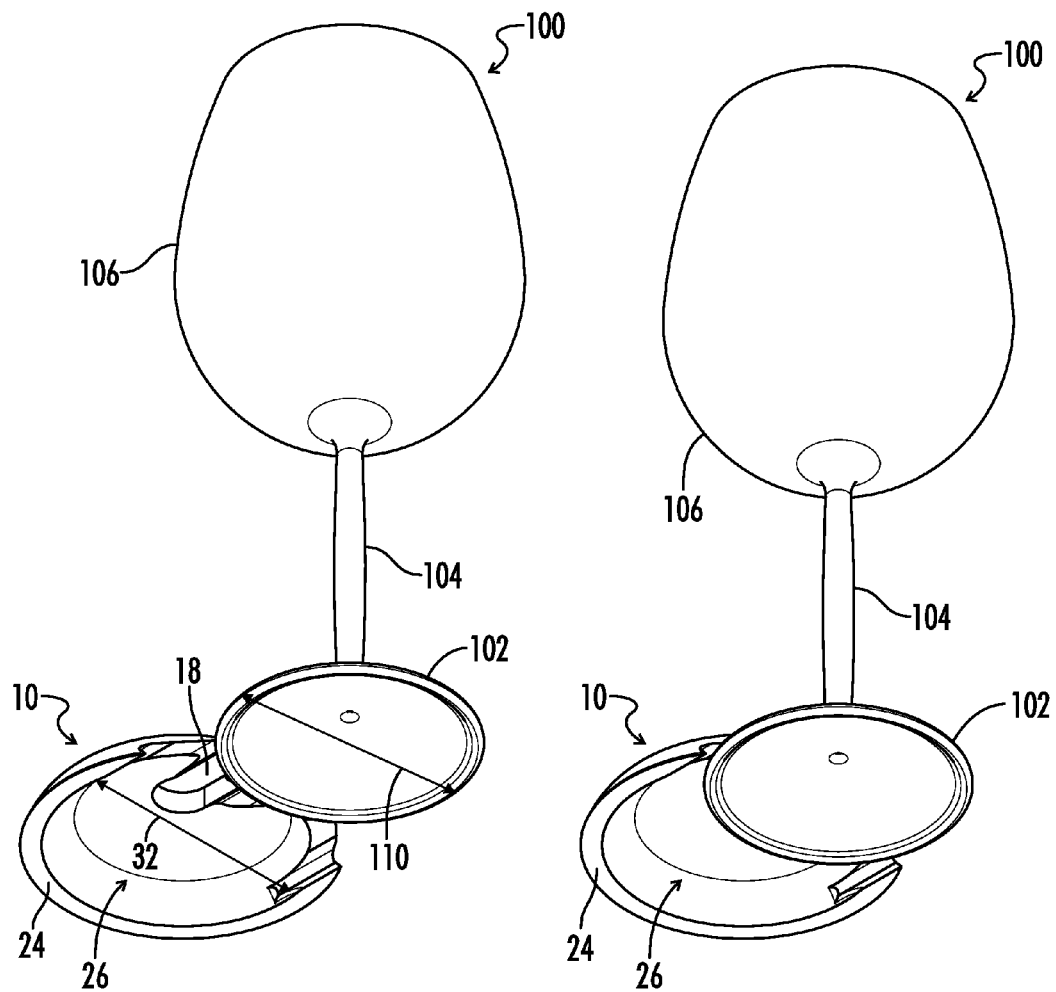
FIG. 12 illustrates a perspective view of an embodiment of a stemware stabilizer apparatus positioned for installation on a wine glass.
FIG. 13 illustrates a perspective view of an embodiment of a stemware stabilizer apparatus positioned for installation on a wine glass.
Figure 14:
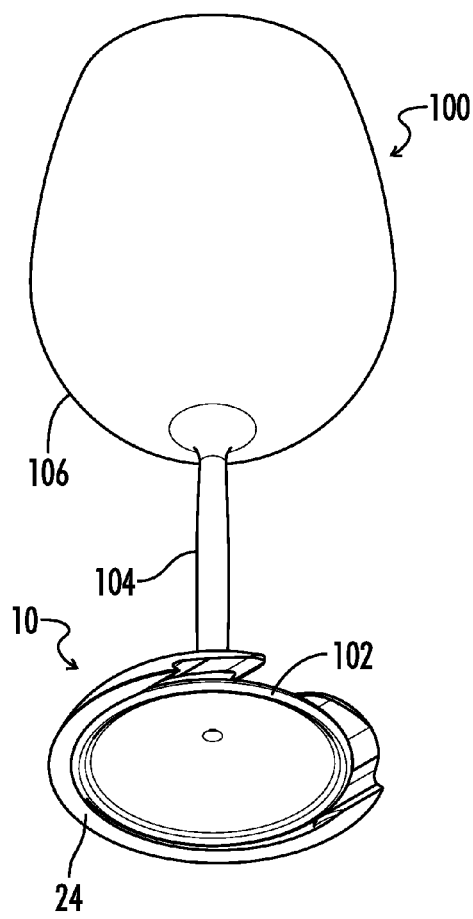
FIG. 14 illustrates a perspective view of an embodiment of a stemware stabilizer apparatus positioned for installation on a wine glass.

A foot receiver 30 is defined on the stabilizer body 10 in some embodiments. Foot receiver 30 includes a slot on the stabilizer body 10 allowing passage of the foot 102 into the foot chamber. Referring to FIG. 9, foot 102 on stemware 100 includes a foot diameter 110. Foot receiver 30 includes a foot receiver width 32 greater than the foot diameter 110 to allow passage of the foot 102, as shown in FIG. 12. Foot receiver 30 includes opposing substantially straight edges 30a, 30b, as seen in FIG. 4 to allow travel of foot 102 into and out of foot chamber 26 in some embodiments.

The stabilizer device may be positioned on a wine glass in a variety of installation modes. Referring to FIGS. 9-11, in some embodiments the wine glass stem and foot may be moved substantially horizontally relative to the stationary stabilizer device to position the device on the wine glass. For example, the stabilizer device may be placed on a table or other surface, and the stemware is moved into a position relative to the stabilizer device such that the stem is received in the stem receiver slot 18 and the foot is received in the foot chamber 26 via the foot receiver 30.

In another mode of installation, the stabilizer device may be moved substantially horizontally relative to a stationary stemware to position the device on the stemware. For example, a wine glass may be sat on a table or surface, and the stabilizer device is slid substantially horizontally over the foot such that the foot is received in the foot chamber 26 via the foot receiver 30 and the stem is received in the stem receiver slot 18.

Figure 16:
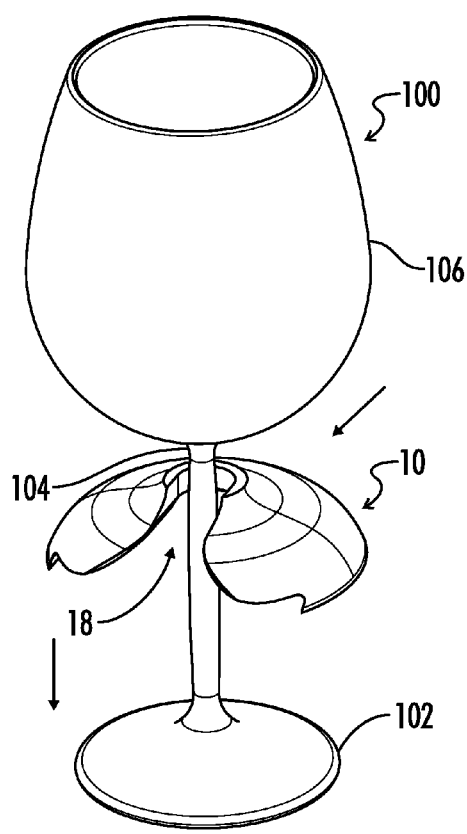
FIG. 16 illustrates a perspective view of an embodiment of a stemware stabilizer apparatus positioned for installation on a wine glass.

In yet another mode of installation, as seen in FIG. 16, the stabilizer body 10 may be positioned radially onto the wine stem 104 at a vertical location on the stem 104 between the foot 102 and the bowl 106 by receiving the stem 104 in the stem receiver slot 18. The stabilizer body 10 may then be lowered vertically toward the foot 102 while the stem 104 is received in the stem receiver slot 18. The downward travel of the stabilizer body 10 stops when the stabilizer body 10 contacts the foot 102 or when the bottom face 24 reaches the table or surface on which the wine glass rests.

Referring to FIG. 19, in some embodiments the bottom face 24 rests against a table or other surface 28 on which the wine glass sits when the stabilizer device is installed on the wine glass. In such embodiments, the bottom face 24 is substantially co-planar with the bottom plane of the foot 102 of the wine glass. Referring to FIG. 20, in additional embodiments, wine glass 102 may have a thicker foot, and the bottom face 24 does not contact the table or surface 28 on which the wine glass sits. A gap 44 is formed between the bottom face 24 of the stabilizer device and the table or surface on which the wine glass sits. Even in such embodiments, the stabilizer device is operable to prevent the stemware from tipping over by applying a downward force against the foot 102.

As seen in FIGS. 1-14, stem receiver slot 18 includes a tapered opening 36 in some embodiments to facilitate passage of stem 104 into the stem receiver slot 18. Tapered opening 36 includes a tapered opening width 38 greater than stem receiver slot width 34 in some embodiments. However, a tapered opening is not required, and other embodiments may include a stem receiver slot 18 having a substantially uniform stem receiver slot width 34, as seen in FIGS. 17-18.

Figure 15:
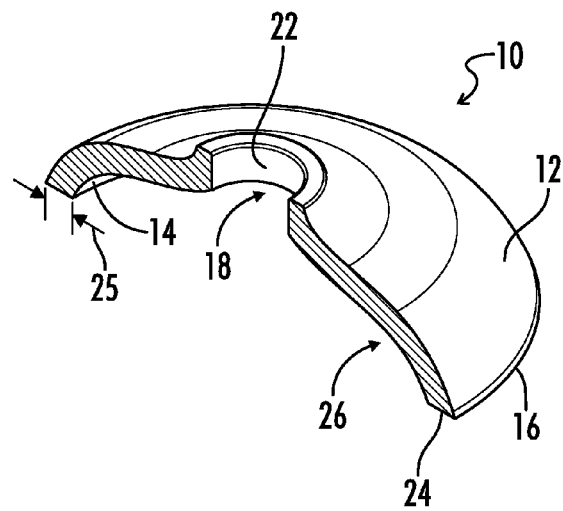
FIG. 15 illustrates a partial cross-sectional perspective view of an embodiment of a stemware stabilizer apparatus.
Figure 21:
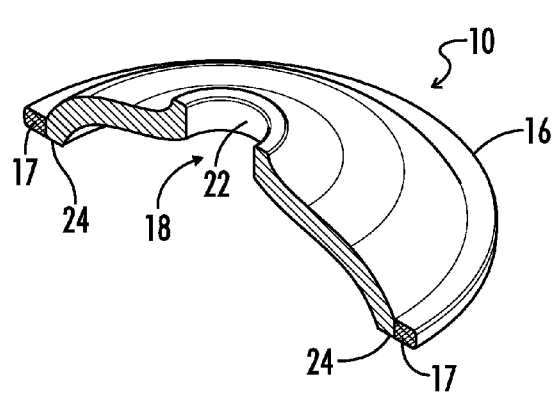
FIG. 21 illustrates a partial cross-sectional perspective view of an embodiment of a stemware stabilizer apparatus.

A cross-sectional view of an embodiment of a stabilizer device is shown in FIG. 15. Stabilizer device includes a bottom face 24 having a bottom face width 25. In some embodiments, bottom face width 25 is between about 1.0 mm and about 20.0 mm. In other embodiments, bottom face width 25 is between about 2.0 mm and about 10.0 mm. Stabilizer device 10 includes an outer edge 16 having a stabilizer weight 17, as seen in FIG. 21, in some embodiments. Stabilizer weight 17 forms a mass on stabilizer body 10 to provide additional force against the foot of stemware. Stabilizer weight 17 can include an integral mass formed on stabilizer body 10 in a one-piece construction together with stabilizer body 10 in some embodiments. Stabilizer weight 17 may be formed of any suitable weight material, and includes the same material as stabilizer body 10 in some embodiments. In other embodiments, stabilizer weight 17 includes a dissimilar material relative to stabilizer body 10. In further embodiments, stabilizer weight 17 is a separate component attached to stabilizer body 10. Stabilizer weight 17 may be removable from stabilizer body 10 in some embodiments.

Figure 17:
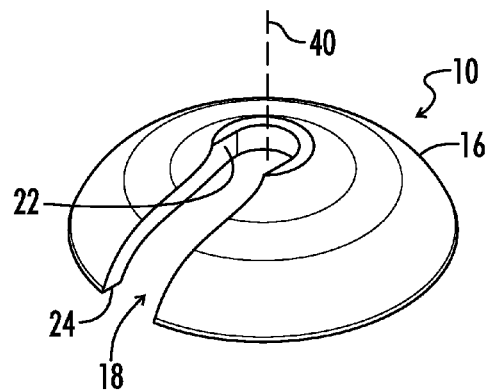
FIG. 17 illustrates a perspective view of an embodiment of a stemware stabilizer apparatus.
Figure 18:
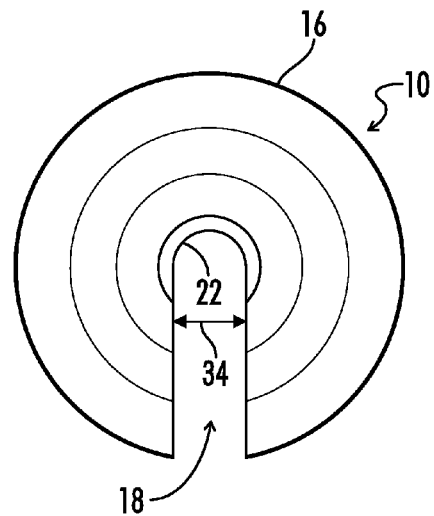
FIG. 18 illustrates a top view of an embodiment of a stemware stabilizer apparatus.

Referring to FIG. 17, in some embodiments, stabilizer body 10 includes an outer edge 16 with a substantially round profile. A stem receiver slot 18 forms a substantially U-shaped opening extending from a location on the outer edge 16 of stabilizer body radially inwardly toward center vertical axis 40 of the stabilizer body 10. Stabilizer body 10 is substantially axi-symmetric about center axis 40 in some embodiments. Stem support 22 is located at the inner end of stem receiver slot 18, providing a radial stop for a stem on a wine glass when the stem is received in stem receiver slot 18. Stem receiver slot 18 includes a substantially constant stem receiver slot width 34 in some embodiments.

Figure 22:
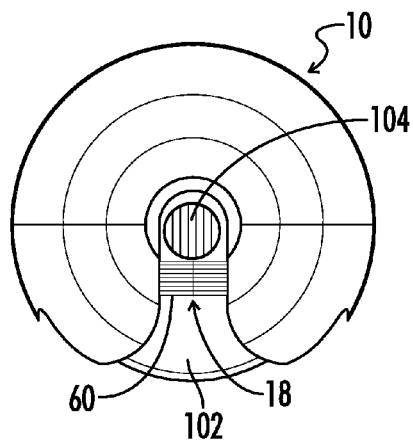
FIG. 22 illustrates a perspective view of an embodiment of a stemware stabilizer apparatus positioned on a wine glass.

Referring to FIG. 22, in some embodiments, the stabilizer device includes one or more stem retainers 60 protruding from stabilizer body 10 into stem receiver slot 18. Stem retainers 60 in some embodiments include flexible bristles extending outwardly into stem receiver slot 18 such that wine glass stem 104 may be inserted into the stem receiver slot 18 past the retainers 60. In some embodiments, a first group of bristles extend from a first side of stem receiver slot 18, and a second group of bristles extend from a second side of stem receiver slot 18 opposite the first side of stem receiver slot 18. The bristles from the opposing sides may butt against each other along a center line of stem receiver slot 18 in some embodiments. The stem retainers 60 are resiliently biased to protrude into the stem retainer slot 18 to provide resistance against wine glass stem 104 as the stem is inserted into or removed from the stem retainer slot 18. As such, retainers 60 are positioned to prevent the stemware stabilizer from easily sliding off the wine glass via the stem receiver slot 18. Retainer 60 main include any suitable structure protruding into stem retainer slot 18 and is not limited to bristles or flexible brush members. Retainer 60 may include one or more springs or other suitable members for allowing passage of the stem and retaining the stem once received in the stem receiver slot.

Figure 23:
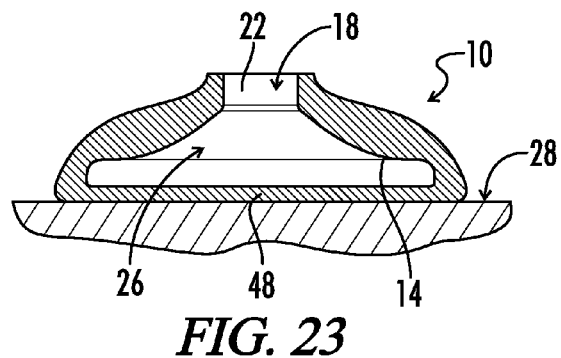
FIG. 23 illustrates a partial cross-sectional view of an embodiment of stemware stabilizer apparatus with a floor.
Figure 24:
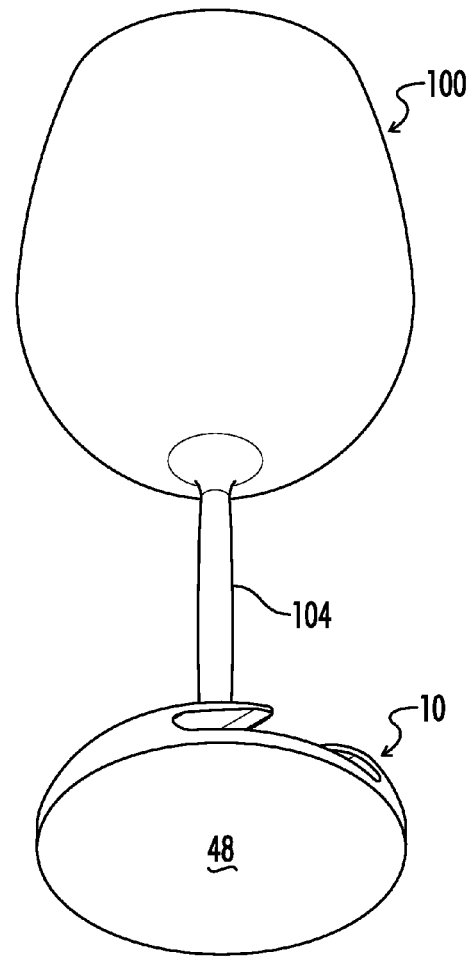
FIG. 24 illustrates a bottom perspective view of an embodiment of a stemware stabilizer apparatus with a floor.

In some additional embodiments, stabilizer body 10 includes a floor 48 below the foot chamber 26, as seen in FIGS. 23 and 24. Floor 48 includes a structure spanning the foot chamber 26. Foot 102 is housed in foot chamber 26 between floor 48 and lower side 14 of stabilizer body 10 in some embodiments. As such, stabilizer body 10 is radially moveable onto foot 102 to receive foot 102 in foot chamber between floor 48 and lower side 14 in some embodiments. Floor 48 forms a closed base on the stemware stabilizer apparatus. Floor 48 may integrally formed on the stabilizer body as a one-piece, integral construction in some embodiments. Alternatively, floor 48 includes a separate piece attached to stabilizer body 10.

Figure 25:
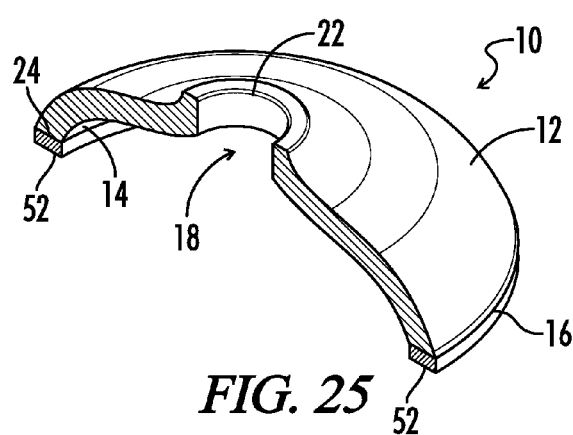
FIG. 25 illustrates a partial cross-sectional perspective view of an embodiment of a stemware stabilizer apparatus.

In further embodiments, the apparatus includes one or more fasteners disposed on bottom face 24 to secure the stabilizer body to a surface such as a table. As seen in FIG. 25, in some embodiments, bottom face 24 includes a semi-annular surface around the perimeter of stabilizer body 10. One or more fasteners 52 are positioned on bottom face 24. Each fastener 52 includes a magnet in some embodiments. For example, fastener 52 includes a strip magnet disposed on bottom face 24 of stabilizer body 10 in some embodiments. The strip magnet allows the stabilizer apparatus to be secured to a metal surface such as a table. Fastener 52 in other embodiments may include a hook-and-loop material, an adhesive fastener, or any other suitable fastener material for securing stabilizer body 10 to another surface.

The present disclosure provides a stemware stabilizer apparatus that may be installed on a stemware item such as a wine glass to prevent the stemware from tipping over under reasonable conditions. Although the stemware stabilizer apparatus may be operable in some applications to aid in preventing stemware from tipping over, the apparatus may not prevent tipping over in all conditions, such as high wind or exceptionally rough conditions.

Thus, although there have been described particular embodiments of the present invention of a new and useful Stemware Stabilizer Apparatus, it is not intended that such references be construed as limitations upon the scope of this invention.

What is claimed is:

1. An apparatus for stabilizing a wine glass, the apparatus comprising:
    the wine glass including a foot with an upper side having a tapered profile, a stem, and a bowl;
    a stabilizer body forming a round disk, the stabilizer body having an upper side, a lower side, a vertical center axis and an outer edge, wherein the stabilizer body is substantially axi-symmetric about the vertical center axis of the stabilizer body;
    a stem receiver slot defined through the stabilizer body from the upper side to the lower side, the stem receiver slot positioned on the stabilizer body from the outer edge radially inwardly toward the vertical center axis of the stabilizer body, the stem receiver slot shaped to allow radial passage of the wine glass stem toward the vertical center axis; and
    a stem support positioned on the stabilizer body at an interior end of the stem receiver slot, the stem support co-axially aligned with the vertical center axis of the stabilizer body;
    an open-bottom, concave foot chamber defined below the lower side on the stabilizer body, the foot chamber defining a volume shaped to at least partially receive the foot on the wine glass when the stem is received in the stem receiver slot, wherein the stabilizer body is moveable along the stem in the axial direction,
    wherein the foot chamber includes a tapered profile substantially matching the tapered profile on the upper side of the foot,
    wherein the stabilizer body rests against the upper side of the foot of the wine glass and applies a downward force against the foot of the wine glass when the stem is received in the stem receiver slot, and
    wherein the wine glass stem is co-axially aligned with the vertical center axis of the stabilizer body when the stem is received in the stem receiver slot.

2. The apparatus of claim 1, further comprising a contact surface on the lower side of the stabilizer body, the contact surface positioned to engage the foot on the wine glass and to apply a downward force against the foot on the wine glass when the stem is positioned in the stem receiver slot.

3. The apparatus of claim 2, wherein the foot chamber is open to the stem receiver slot.

4. The apparatus of claim 3, further comprising a foot receiver opening defined in the outer edge of the stabilizer body, the foot receiver opening including a foot receiver opening width.

5. The apparatus of claim 4, wherein the foot receiver opening is shaped to allow radial passage of the foot into the foot chamber.

6. The apparatus of claim 5, wherein the foot receiver opening width is greater than the diameter of the foot on the wine glass.

7. The apparatus of claim 6, wherein the stem support is vertically offset from the contact surface by a stem support vertical offset distance between about 1.0 mm and about 10 cm.

8. The apparatus of claim 5, wherein the contact surface is axially offset from the stem support by a distance greater than about 1.0 mm.

9. The apparatus of claim 5, wherein the contact surface is axially offset from the stem support by a distance between about 1.0 mm and about 10.0 cm.

10. The apparatus of claim 5, wherein the contact surface is axially offset from the stem support by a distance between about 5.0 mm and about 15.0 mm.

11. A weight apparatus for installation on a wine glass to prevent the wine glass from tipping over, the weight apparatus comprising:
   the wine glass including bowl, the wine glass including a stem and the wine glass including a foot, the foot of the wine glass having an upper side with a tapered profile;
   a stabilizer body having an upper side and a lower side, the stabilizer body including a vertical center axis;
   a stem receiver slot defined in the stabilizer body, the stem receiver slot shaped to receive the stem on the wine glass; and
   a concave, foot chamber defined by the lower side of the stabilizer body, the foot chamber defining a volume shaped to at least partially receive the foot on the wine glass, wherein the foot chamber includes a tapered profile substantially matching the tapered profile on the upper side of the foot,
   wherein the stabilizer body is axially moveable along the stem of the wine glass when the stem is received in the stem receiver slot, and
   wherein the lower side of the stabilizer body engages the upper side of the foot on the wine glass and applies a downward force against the upper side of the foot, and
   wherein the stem of the wine glass is co-axially aligned with the vertical center axis of the stabilizer body when the stem of the wine glass is received in the stem receiver slot.

12. An apparatus for stabilizing stemware, comprising:
   the piece of stemware having a foot, the foot including an upper side, the upper side of the foot including a tapered profile, the piece of stemware including a stem rising from the foot and a bowl disposed on the stem above the foot;
   a body having an upper side, a lower side, an outer edge and a transverse axis;
   a stem receiver slot defined in the body extending from a location on the outer edge toward the axis, the stem receiver slot terminating at a stem support on the body;
   a concave, open-bottom foot chamber defined below the lower side, the foot chamber defining a volume shaped to at least partially receive the foot, the foot chamber including a tapered profile substantially matching the tapered profile on the upper side of the foot; and
   a contact surface on the lower side of the body engaging the foot and applying a downward force against the foot;
   wherein the body is axially moveable along the stem when the stem is received in the stem receiver slot, and
   wherein the stem is co-axially aligned with the transverse axis of the body when the stem is received in the stem receiver slot.

13. The apparatus of claim 12, wherein the contact surface is axially offset from the stem support by an axial distance between about 1.0 mm and about 30.0 mm.

\* \* \* \* \*